(No Model.) 2 Sheets—Sheet 2.
C. E. BUELL.
MEANS FOR STORING AND UTILIZING ELECTRICITY ON VEHICLES.
No. 347,768. Patented Aug. 24, 1886.
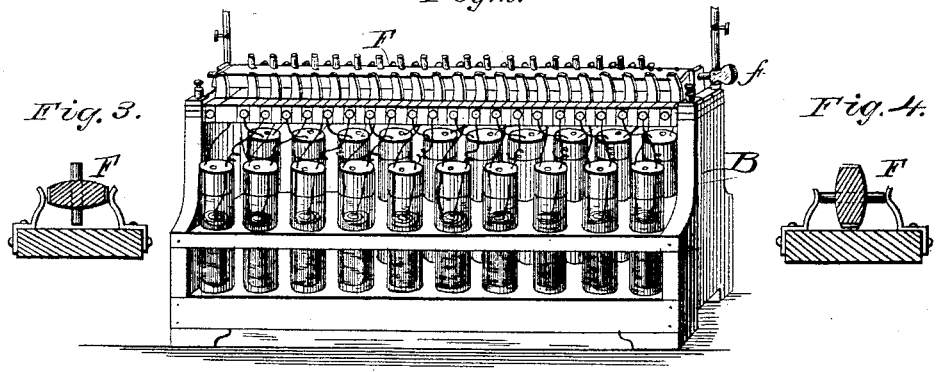
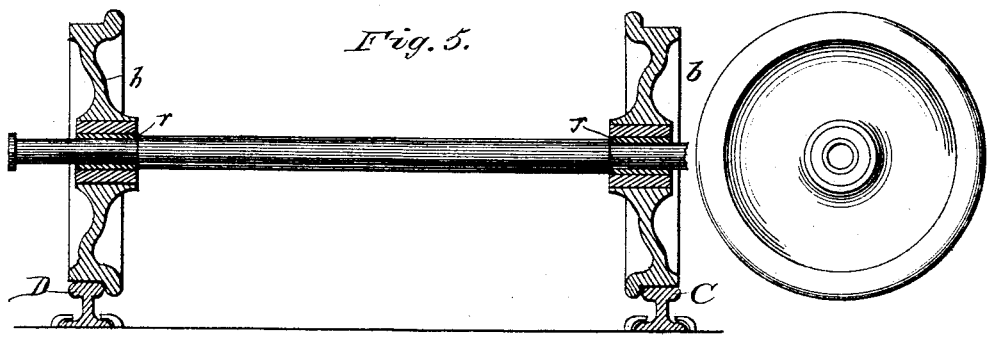
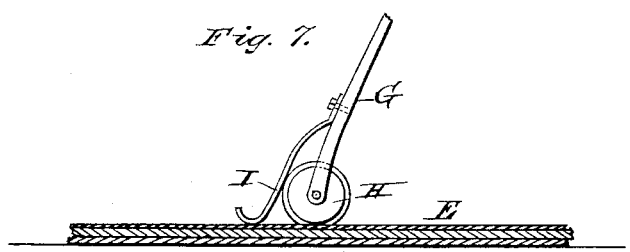
WITNESSES:
INVENTOR.

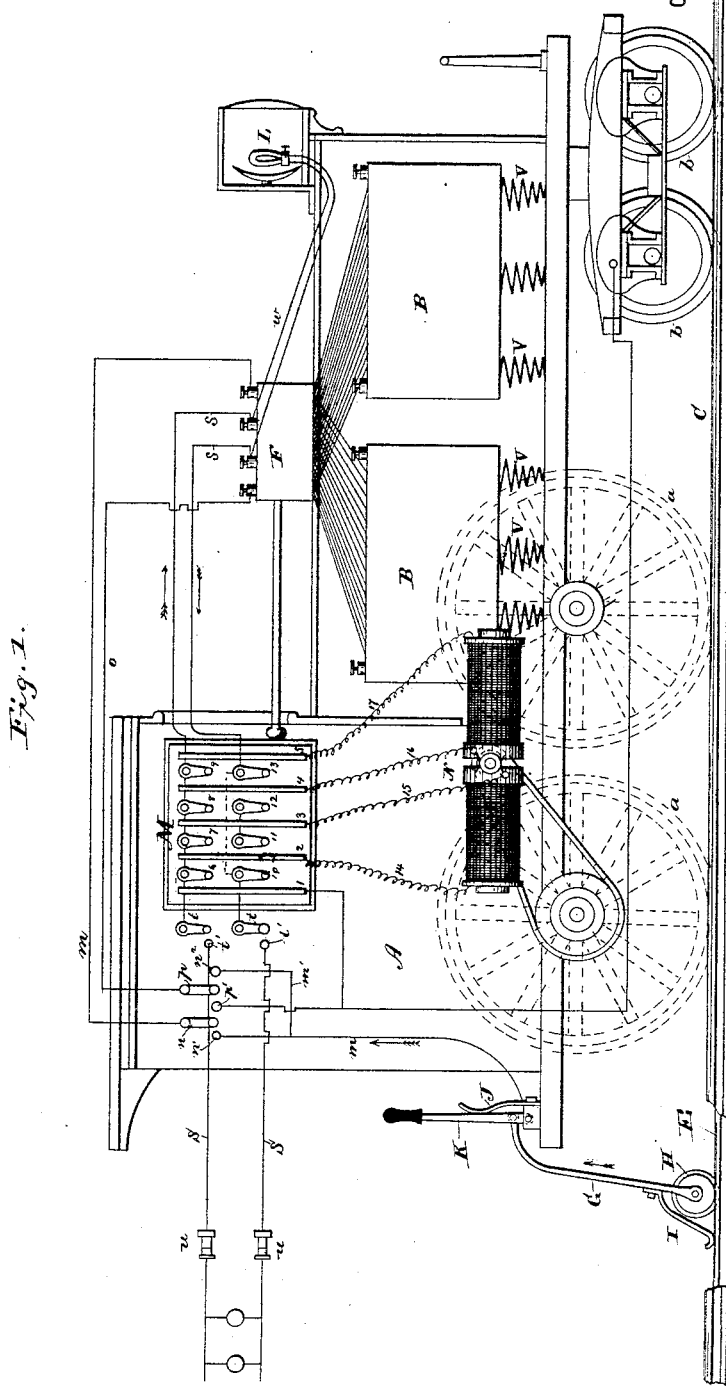

UNITED STATES PATENT OFFICE.

CHARLES E. BUELL, OF NEW HAVEN, CONNECTICUT.

MEANS FOR STORING AND UTILIZING ELECTRICITY ON VEHICLES.

SPECIFICATION forming part of Letters Patent No. 347,768, dated August 24, 1886.

Application filed May 5, 1882. Serial No. 60,500. (No model.)

*To all whom it may concern:*

Be it known that I, CHARLES E. BUELL, of New Haven, in the county of New Haven and State of Connecticut, have invented certain new and Improved Means for Storing and Utilizing Electricity on Vehicles; and I hereby declare the following to be a full, clear, and exact description of the same, reference being had to the accompanying drawings, forming part of this specification, in which—

Figure 1 is an elevation of a vehicle arranged for the storage and utilization of electricity in accordance with my invention. Fig. 2 is a view of a series of secondary batteries or accumulators with switch devices for coupling them alternately in multiple arc and in tension series. Figs. 3 and 4 are detail sectional views showing the switching devices in different positions. Fig. 5 is a view showing a manner of insulating the wheels of the vehicle. Fig. 6 shows one of the wheels of the vehicle in elevation, and Fig. 7 is a view of the means for taking the current off the charging-circuit.

Similar letters of reference in the several figures denote the same parts.

My invention relates to improved means for storing electricity on railroad-trains and other vehicles, and for utilizing the same in driving electric motors to propel the train or vehicle, for electric lighting, and for other purposes.

To this end my invention consists, broadly, of a charged electrical conductor extending along the path of the vehicle, means on the vehicle for taking the current from said charged conductor, whether the vehicle be at rest or in motion, and a series of secondary batteries also located on the vehicle and adapted to be charged by the current so taken off.

It further consists in the combination of a charged electric conductor extending along the path of the vehicle, with the vehicle carrying means for taking the current from said charged conductor, two or more series of secondary batteries, a separate working-circuit, and switch devices for placing the series of secondary batteries alternately in the charging-circuit to be charged, and in the working-circuit to be discharged.

It also consists in certain other novel combinations and sub-combinations of parts, which will be hereinafter described, and pointed out in the claims.

Referring to the accompanying drawings, A represents a locomotive-engine whose traction-wheels *a a b b* are adapted to run upon traction-rails C D, as shown. Between the rails C D is preferably arranged a third rail or conductor, E, which, in connection with one or the other of the rails C D—rail C, for instance—constitutes an electric circuit, which is kept constantly charged by means of a powerful dynamo-electric machine located at any suitable point along the line of the road.

Mounted upon the locomotive are two series of secondary batteries, B B, the plates of which are connected to a suitable switch by whose operation one series of batteries can be interposed in a charging-circuit to be charged, while the other series is interposed in an independent circuit to be discharged. The ordinary form of switch indicated at F in Figs. 2, 3, and 4, and adapted to couple the plates of the battery being charged in multiple arc, and the plates of the batteries to be discharged in tension series, is preferably employed. The construction of this switch is so well known to persons skilled in the art that further description of it herein is unnecessary, more than to state that by turning the handle *f* to one position one series of batteries is arranged for charging and the other for discharging, while by turning it to another position the arrangement of the series is reversed. As a means for taking off the current from the charging-circuit C E, I preferably arrange upon the locomotive an arm, G, hinged to the locomotive in any suitable manner and carrying at its lower end a grooved contact-wheel, H, or a contact-spring, I, or both, adapted to bear with yielding pressure upon the middle rail, E, by means of a spring or other contrivance, J, bearing against the lever K. The current passes through one or both of the contacts, up the arm G, over line *m* and switch *n*, to the switching mechanism F of the secondaries, thence through the series of secondaries arranged for charging, back to the secondaries' switch, thence through line *o* and switch *p* to one of the wheels *b* on rail C, into the charging circuit again.

To enable the secondary batteries to be charged by currents of the same direction, the conductor $m$ is provided with a branch, $m'$, terminating in the contact $n^2$. When the current in the main charging-circuit is in one direction, switches $n$ and $p$ are turned to contacts $n'$ and $p'$, respectively; but when the current in the main charging-circuit is in the opposite direction, said switches $n$ and $p$ are turned to contacts $p'$ and $n^2$. I am thus enabled to at all times pass currents of the same direction into the secondaries.

The independent working-circuit into which the secondary batteries discharge is indicated by the letters $s\ s$, and extends from the switch of the secondaries through the switches $t\ t$ to the couplings $u\ u$, which are adapted to be connected with other couplings on an electric circuit extending throughout the entire train of attached vehicles and including in it directly-interposed electric lamps.

A switch-board, M, is arranged within the cab of the locomotive and provided with strips 1 2 3 4 5 and switches 6 7 8 9 10 11 12 13, which latter are normally connected with the working-circuit $s\ s$ of the secondary batteries, and are adapted to be swung in contact with the conducting-strips 1 2 3 4 5.

N represents an electric motor, the armature $x$ of which is geared to the axle of one of the driving-wheels $a$, so as to impart its motion thereto.

Lines 14 15 16 17 connect the strips 2 3 4 5 of the switch-board to the electric motor, as shown.

The motor is shown with the field-magnets connected to the strips of the switch and its armature connected to a separate pair of strips, so that the currents can be manipulated in any desired manner through the motor—i. e., the field-magnets can be used connected in series with the armature, or be connected in a separate branch of the circuit from that which includes the armature. By the employment of a switch that will permit of a variety of changes, the great advantage of being able to put the field-magnets and armature in series when running on a level, then splitting the current through the field-magnets and armature when climbing a grade, is possible, and is only possible by the employment of a switch substantially similar to the one shown.

In order to place the armature in series with the field-magnets, as mentioned above, it is only necessary to place arm 13 upon strip 5, arm 11 upon strip 2, arm 12 upon strip 3, and arm 9 upon strip 4, and these connections are to be made when the vehicle is running on a level or slight grade; but when it is running on a steep grade and it is desired to put the armature and field-magnets in multiple circuit it is only necessary to place arm 9 upon strip 5, arm 10 upon strip 2, arm 11 upon strip 2, arm 12 upon strip 3, and arm 8 upon strip 4, as will also be readily understood.

The various manipulations of the switch necessary for reversing the motor will be readily understood by one skilled in the art, the only thing necessary being to have the current through the field-magnets and armature in the opposite direction from its former course.

It is of course understood that at the time the motor is being run by the secondary batteries the switches $t\ t$ are swung out of connection with their contacts $t'\ t'$.

A branch, $w$, of the working-circuit of the secondaries is made to include an electric lamp, L, which serves as the head-light of the locomotive.

It is evident that by my invention any number of electric locomotives running upon the line may be charged either while in motion or at rest from the single charging-circuit, and that primary currents of less energy than have heretofore been employed can be stored up in the secondary batteries, while currents of the greatest energy required and of great quantity may be obtained from the series of storage-batteries to propel the train by the electric motors and also be utilized to effectually illuminate the train or to operate suitable electric-brake mechanism.

The above-described embodiment of my invention represents it in one of its simplest forms, and many modifications at once suggest themselves.

The arrangement of the switch devices is such that the whole current from the secondaries may be caused to pass either through the motor or into the light circuit, or it may be divided through both.

By means of the lever K the contacts H and I can be made to move down upon or away from the conductor E, so as to take off the current from said conductor or not, as desired. The grooved contact-wheel is preferably used either alone or in connection with the spring-contact I, as its flanges operate at all times to preserve the contact.

Where both traction-rails C D are employed as the conductors of the main charging-circuit, it is necessary to insulate all the wheels of the train from their respective axles. This may be accomplished in any suitable manner—for instance, by the interposition of insulating material between the wheels and axle, as shown in Fig. 5.

The secondary batteries B may be suitably suspended upon the vehicle, or they may be mounted upon springs V, as shown in Fig. 1.

Having thus described my invention, I claim as new—

1. The herein-described means for storing electricity on vehicles, consisting of a charged electrical conductor extending along the path of the vehicle, means on the vehicle for taking the current from said charged conductor whether the vehicle be at rest or in motion, and a series of secondary batteries on the vehicle adapted to be charged by the current so taken off.

2. The combination, substantially as described, of a charged electrical conductor extending along the path of a vehicle with a vehicle carrying means for taking the current from said charged conductor, two or more series of secondary batteries, a separate working-circuit, and switch devices for placing the series of secondary batteries alternately in the charging-circuit to be charged and in the working-circuit to be discharged.

3. The combination, substantially as described, with a charging-circuit extending along the path of a vehicle, of a vehicle carrying means for taking the current from said charging-circuit, one or more series of secondary batteries, an electric motor for propelling the vehicle adapted to be included in a working-circuit, and switch devices for placing the secondary batteries alternately in the charging-circuit to be charged and into the working-circuit to be discharged.

4. The combination of a charging-circuit extending along the path of a vehicle with a vehicle carrying means for taking the current from said charging-circuit, one or more series of secondary batteries, a circuit containing electric lamps, a circuit including an electric motor for propelling the vehicle, and switch devices for conducting the current from the secondary batteries through either or both of said last-mentioned circuits, substantially as described.

5. The combination, with the conductor extending along the path of the vehicle, the vehicle having electrical translating devices thereon, of a device for taking the current from said conductor, consisting of the standard having the roller and spring contacts thereon, both making contact with the same conductor, substantially as described.

6. The combination, with a vehicle, of a battery or batteries thereon, one or more circuits that include translating devices, and connections from said batteries through a switch mechanism to an electric circuit outside of said vehicle, substantially as described.

7. The combination, with a vehicle, of a motor mounted thereon for propelling said vehicle and connections from said motor through switch mechanism to a battery upon the vehicle, and connections from the battery to a charged circuit outside said vehicle.

8. The combination of the vehicle having two or more batteries thereon, a working-circuit, switch devices for placing said batteries into the working-circuit alternately, and independent switch devices for placing either of two or more circuits containing translating devices in connection with the working-circuit, substantially as described.

CHARLES E. BUELL.

Witnesses:
MELVILLE CHURCH,
FRED F. CHURCH.